US010678432B1

(12) United States Patent
Dreier et al.

(10) Patent No.: US 10,678,432 B1
(45) Date of Patent: Jun. 9, 2020

(54) USER SPACE AND KERNEL SPACE ACCESS TO MEMORY DEVICES THROUGH PRIVATE QUEUES

(71) Applicant: PURE STORAGE, INC., Mountain View, CA (US)

(72) Inventors: Roland Dreier, Mountain View, CA (US); Bryan Freed, Los Altos, CA (US); Logan Jennings, Menlo Park, CA (US); Sandeep Mann, Fremont, CA (US)

(73) Assignee: Pure Storage, Inc., Mountain View, CA (US)

( * ) Notice: Subject to any disclaimer, the term of this patent is extended or adjusted under 35 U.S.C. 154(b) by 502 days.

(21) Appl. No.: 15/416,990

(22) Filed: Jan. 26, 2017

Related U.S. Application Data (60) Provisional application No. 62/403,868, filed on Oct. 4, 2016.

(51) Int. Cl.
*G06F 3/00* (2006.01)
*G06F 3/06* (2006.01)

(52) U.S. Cl.
CPC ............ *G06F 3/0604* (2013.01); *G06F 3/067* (2013.01); *G06F 3/0617* (2013.01); *G06F 3/0659* (2013.01); *G06F 3/0689* (2013.01)

(58) Field of Classification Search
CPC ...... G06F 13/00; G06F 3/0604; G06F 3/0617; G06F 3/0659; G06F 3/067; G06F 3/0689
USPC ............................ 710/52, 20, 5, 39; 718/100
See application file for complete search history.

(56) References Cited

U.S. PATENT DOCUMENTS

| | | | |
|---|---|---|---|
| 6,286,056 B1 | 9/2001 | Edgar et al. | |
| 6,766,515 B1 * | 7/2004 | Bitar ..................... | G06F 9/4843 |
| | | | 712/228 |
| 6,804,703 B1 | 10/2004 | Allen et al. | |
| 6,954,881 B1 | 10/2005 | Flynn, Jr. et al. | |
| 7,139,907 B2 | 11/2006 | Bakke et al. | |
| 7,272,674 B1 | 9/2007 | Nandi et al. | |
| 7,313,636 B2 | 12/2007 | Qi | |
| 7,577,802 B1 | 8/2009 | Parsons | |
| 8,103,754 B1 | 1/2012 | Luong et al. | |

(Continued)

OTHER PUBLICATIONS

Ouyang, J. et al. (Mar. 1-5, 2014) "SDF: Software-Defined Flash for Web-Scale Internet Storage Systems", ASPLOS 2014, 14 pages.

(Continued)

*Primary Examiner* — Tim T Vo
*Assistant Examiner* — Kim T Huynh
(74) *Attorney, Agent, or Firm* — Womble Bond Dickinson (US) LLP; Daniel E. Ovanezian (57) ABSTRACT

A storage controller coupled to a storage array includes a device driver running in a kernel space that receives an administrative command from an application running in a user space of the storage controller and writes the administrative command to a first submission queue of a plurality of submission queues associated with a storage device in the storage array, where the first submission queue is reserved for use by the device driver. An input/output (I/O) command received from the application running in the user space, however, is written directly to a second submission queue of the plurality of submission queues without being routed through the kernel space, where the second submission queue being reserved for direct access by the application running in the user space.

20 Claims, 6 Drawing Sheets

(56) References Cited

U.S. PATENT DOCUMENTS

| | | | |
|---|---|---|---|
| 8,271,996 B1* | 9/2012 | Gould | G06F 9/542 |
| | | | 719/312 |
| 8,301,811 B1 | 10/2012 | Wigmore et al. | |
| 8,645,649 B2 | 2/2014 | Kaiya et al. | |
| 9,063,937 B2 | 6/2015 | McDowell et al. | |
| 9,294,567 B2 | 3/2016 | Hussain et al. | |
| 9,430,412 B2 | 8/2016 | Huang | |
| 9,501,245 B2 | 11/2016 | Hussain et al. | |
| 9,565,269 B2 | 2/2017 | Malwankar et al. | |
| 2006/0095610 A1* | 5/2006 | Arndt | G06F 5/10 |
| | | | 710/52 |
| 2008/0034167 A1 | 2/2008 | Sharma et al. | |
| 2011/0126269 A1* | 5/2011 | Youngworth | G06F 12/109 |
| | | | 726/4 |
| 2013/0024875 A1* | 1/2013 | Wang | G06F 13/22 |
| | | | 719/318 |
| 2014/0380319 A1* | 12/2014 | Haverkamp | G06F 9/4881 |
| | | | 718/102 |
| 2015/0019798 A1* | 1/2015 | Huang | G06F 12/0246 |
| | | | 711/103 |
| 2017/0024166 A1 | 1/2017 | Singh et al. | |
| 2017/0123971 A1* | 5/2017 | Kanaujia | G06F 12/0246 |

OTHER PUBLICATIONS

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

* cited by examiner

USER SPACE AND KERNEL SPACE ACCESS TO MEMORY DEVICES THROUGH PRIVATE QUEUES

RELATED APPLICATIONS

This application claims priority to U.S. Provisional Patent Application No. 62/403,868 filed Oct. 4, 2016, the entire contents of which are hereby incorporated by reference herein.

BACKGROUND

As computer memory storage and data bandwidth increase, so does the amount and complexity of data that businesses manage daily. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

BRIEF DESCRIPTION OF THE DRAWINGS

The present disclosure is illustrated by way of example, and not by way of limitation, in the figures of the accompanying drawings.

DETAILED DESCRIPTION

A host computer system, such as storage controller, may be designed to interact with a storage device, which may be part of a larger storage array, to execute storage commands and manage operation of the storage device. The host computer system may include one or more queues used for processing commands (e.g., I/O related commands), implemented in system memory. Each queue may refer to a pair of corresponding submission and completion queues. The submission queues store storage commands to be fetched by the storage device, while the completion queues store results provided by the storage device indicating execution of corresponding storage commands. The host computer system may also include a kernel space device driver, executed by a processor. In certain systems, the kernel space device driver places commands onto the submission queues and reads results from the completion queues. In one embodiment, the storage commands may be generated by an application running in a user space on the host computer system, while the device driver runs in a kernel space on the host computer system. Throughout the description that follows, the terms hardware queue(s), I/O queue(s) admin queue(s), submission queue(s), completion queue(s), and queue pair(s) may be used when describing the above referenced data structure(s). Depending on the particular implementation, any of the above referenced queues may be used to store different types of commands or acknowledgments, such as administrative commands and/or I/O related commands. In addition, although reference may be made to a single queue (e.g., a submission queue), depending on the embodiment, that single queue may have a corresponding queue (e.g., a completion queue) which together make up queue pair. In other embodiments, multiple submission queues may be associated with the same completion queue.

Modern computing systems generally segregate virtual memory into a kernel space and one or more user spaces. This separation is generally done in order to provide memory protection and hardware protection from malicious or errant software behavior. In general, the kernel space is reserved for running a privileged operating system kernel, kernel extensions, and device drivers, such as kernel space device drivers, while the user spaces are where application software executes. Since the kernel space device driver that manages the submission queues and completion queues runs in the kernel space, storage commands from an application running in user space are generally passed from user space to kernel space, where they traverse a kernel stack before being placed onto the submission queue and retrieved by the storage device. The kernel stack may include the kernel space device driver, and possibly other modules, such as a block layer. Traversing this kernel stack can be a time consuming processes that increases a latency associated with execution of the storage commands.

In one embodiment, the system described herein introduces concurrent user space and kernel space access from the host computer system to storage devices through private, reserved I/O queues. In one embodiment, the kernel space device driver on the host machine reserves certain I/O queues for direct access by an application running in user space, while still maintaining other I/O queues for use by the kernel space device driver itself. In this manner, the application running in user space can place certain types of storage commands directly onto the reserved I/O queues, without routing those commands through the kernel space. The application may bypass the kernel space for certain types of commands including latency sensitive input/output (I/O) commands such as read operations, write operations, etc. For other types of commands, however, such as administrative commands or other latency tolerant commands, the application may utilize the kernel space device driver running in kernel space to place the commands in corresponding I/O queues. Accordingly, the application can reduce the latency associated with processing certain types of commands by writing these commands directly to a reserved I/O queue. In one embodiment, the storage device can fetch different commands from different I/O queues concurrently, including I/O queues reserved for use by both the user space and the kernel space.

Figure 1:
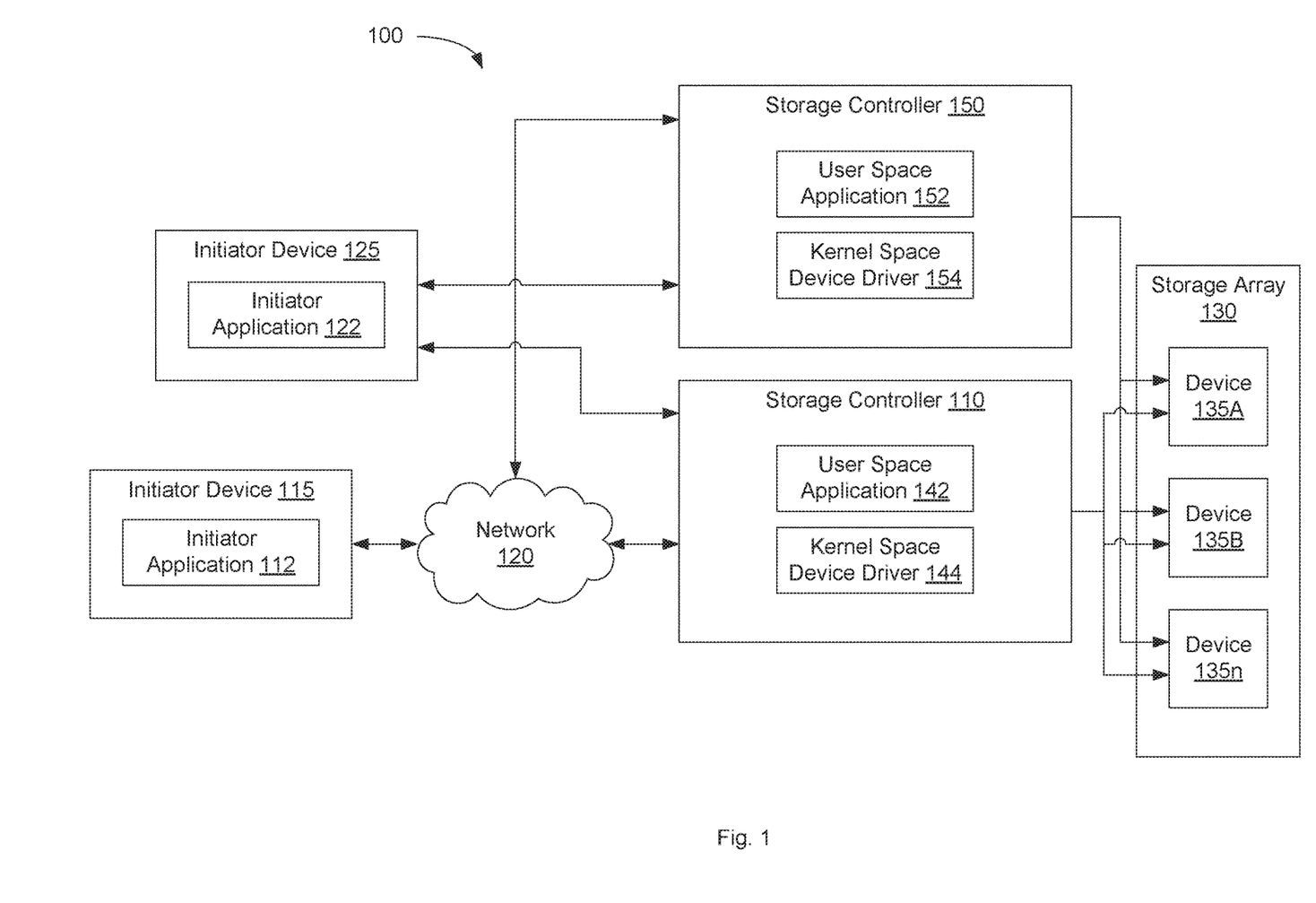
FIG. 1 is a block diagram illustrating a storage system in which embodiments of the present disclosure may be implemented.

FIG. 1 is a block diagram illustrating a storage system 100 in which embodiments of the present disclosure may be implemented. Storage system 100 may include storage controllers 110, 150 and storage array 130, which is representative of any number of data storage arrays or storage device groups. As shown, storage array 130 includes storage devices 135A-n, which are representative of any number and type of storage devices (e.g., solid-state drives (SSDs)). Storage controllers 110 and 150 may be coupled directly to initiator device 125 and storage controllers 110 and 150 may be coupled remotely over network 120 to initiator device 115. Initiator devices 115 and 125 are representative of any number of clients which may utilize storage controllers 110 and 150 for storing and accessing data in storage system 100. It is noted that some systems may include only a single client or initiator device, connected directly or remotely, to storage controllers 110 and 150.

In one embodiment, controller 110 is designated as the "primary" controller, which performs most or all of the I/O operations on the array 130. If, however, a software crash, hardware fault or other error occurs, the "secondary" controller 150 may be promoted to serve as the primary controller and take over all responsibilities for servicing the array 130. In one embodiment, storage controllers 110 and 150 are identical and any description of controller 110 herein may be equally attributed to storage controller 150.

Storage controller 110 may include software and/or hardware configured to provide access to storage devices 135A-n. In one embodiment, storage controller 110 is connected to storage device 135A-n over a data bus, such as a Peripheral Component Interconnect express (PCIe) bus that operates within the framework of the Non-Volatile Memory express (NVMe) communication interface. In general, the NVMe communication interface makes use of submission and completion queues located on the host side for submitting storage commands and receiving confirmation of the execution of those commands on the storage devices. One of storage devices 135A-n may fetch commands from the submission queue, execute the fetched command, and return results to the completion queue. In another embodiment, the submission and completion queues are located on the storage devices. NVMe, as a logical device interface, capitalizes on the low latency and internal parallelism of flash-based storage devices, mirroring the parallelism of contemporary CPUs, platforms and applications. NVMe allows levels of parallelism possible in modern solid state drives (SSDs) to be fully exploited by the host hardware and software. As a result, NVMe reduces I/O overhead and provides various performance improvements in comparison to previous logical device interfaces, including multiple, long command queues, and reduced latency.

Although storage controller 110 is shown as being separate from storage array 130, in some embodiments, storage controller 110 may be located within storage array 130. Storage controller 110 may include or be coupled to a base operating system (OS), a volume manager, and additional control logic for implementing the various techniques disclosed herein. In one embodiment, the OS is designed with flash storage in mind, so while it can use conventional SSDs to store data, it does not depend on a 512 byte random overwrite capability. Even on conventional SSDs, storage controller 110 can achieve better performance by writing and discarding data in large chunks. This style of I/O is sometimes called "flash friendly I/O." This also makes it a much easier task to convert the OS to use the physical addressing of storage devices, as compared to conventional filesystems.

In one embodiment, the logic of storage controller 110 includes one or more user space applications 142 and one or more kernel space device drivers 144. In one embodiment, there may be a kernel space device driver 144 on storage controller 110 corresponding to each of storage devices 135A-n in storage array 130. As new storage devices are connected to controller 110, new device drivers may be installed. These drivers may be similarly discarded when a corresponding device is disconnected from storage controller 110. Applications wishing to communicate with one of storage devices 135A-n, such as user space application 142, may do so via device driver 144. In one embodiment, multiple applications can access the same kernel space device driver 144 concurrently. In one embodiment, storage controller 150 includes a separate instance(s) of kernel space device driver 154 and one or more other user space applications 152. In one embodiment, storage controller 110 includes a number of I/O queues for storing commands to be fetched by one of storage devices 135A-n. Kernel space device driver 144 may reserve certain queues for direct access by user space application 142 in order to reduce the latency associated with processing certain types of commands (e.g., I/O commands). Additional details regarding these I/O queues are provided below with respect to FIG. 2.

Storage controller 110 may include and/or execute on any number of processing devices and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-n to prevent loss of data due to the failure of a device or the failure of storage locations within a device. Storage controller 110 may also utilize any of various deduplication techniques for reducing the amount of data stored in devices 135A-n by deduplicating common data.

In one embodiment, storage controller 110 may utilize logical volumes and mediums to track client data that is stored in storage array 130. A medium is defined as a logical grouping of data, and each medium has an identifier with which to identify the logical grouping of data. A volume is a single accessible storage area with a single file system, typically, though not necessarily, resident on a single partition of a storage device. The volumes may be logical organizations of data physically located on one or more of storage device 135A-n in storage array 130. Storage controller 110 may maintain a volume to medium mapping table to map each volume to a single medium, and this medium is referred to as the volume's anchor medium. A given request received by storage controller 110 may indicate at least a volume and block address or file name, and storage controller 110 may determine an anchor medium targeted by the given request from the volume to medium mapping table.

In various embodiments, multiple mapping tables may be maintained by storage controller 110. These mapping tables may include a medium mapping table and a volume to medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the initiator devices 115 and 125 to physical locations in storage devices 135A-n. A "physical" pointer value may be read from the mappings associated with a given medium during a lookup operation corresponding to a received read/write request.

The term "mappings" is defined as the one or more entries of the address translation mapping table which convert a given medium ID and block number into a physical pointer value. This physical pointer value may then be used to locate a physical location within the storage devices 135A-n. The physical pointer value may be used to access another mapping table within a given storage device of the storage devices 135A-n. Consequently, one or more levels of indirection may exist between the physical pointer value and a target storage location.

In alternative embodiments, the number and type of client computers, initiator devices, storage controllers, networks, storage arrays, and data storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connections, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the devices 135A-n appear to the initiator devices 115 and 125 as locally attached storage.

Initiator devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, initiator devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, initiator device 115 includes initiator application 112 and initiator device 125 includes initiator application 122. Initiator applications 112 and 122 may be any computer application programs designed to utilize the data on devices 135A-n in storage array 130 to implement or provide various functionalities. Initiator applications 112 and 122 may issue requests to read or write data from certain logical volumes data within storage system 100. Initiator applications 112 and 122 may communicate with the kernel on its corresponding device to send data over a network interface. This data travels over network 120, hitting a network interface on storage controller 110, which utilizes the kernel to get the data to user space application 142. Application 142 can utilize kernel space device driver 144 of storage controller 110 to service the read or write requests, as described in detail herein.

Figure 2:
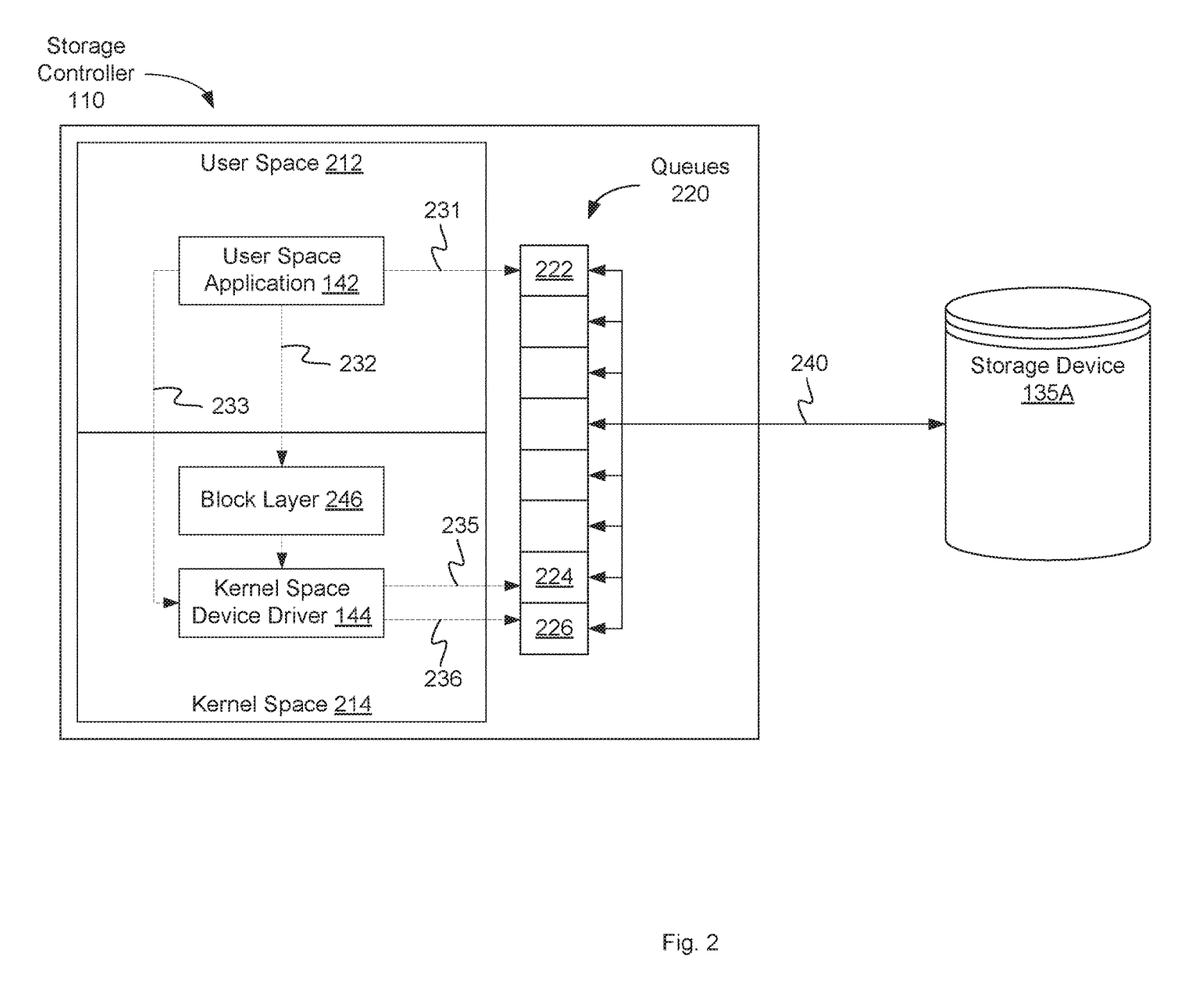
FIG. 2 is a block diagram illustrating user space and kernel space access to memory devices through private queues, according to an embodiment.

FIG. 2 is a block diagram illustrating user space and kernel space access to memory devices through private queues, according to an embodiment. In one embodiment, the virtual memory of storage controller 110 is divided into a user space 212 and a kernel space 214. Kernel space 214 is reserved for running a privileged operating system kernel, kernel extensions, such as block layer 246, and device drivers, such as kernel space device driver 144. User space 212 is reserved for running application software, such as user space application 142. This separation between user space 212 and kernel space 214 provides memory protection and hardware protection from malicious or errant software behavior. This arrangement of modules may be a logical separation, and in other embodiments, these modules, interfaces or other components can be combined together or separated in further components. In one embodiment, storage device 135A is connected to storage controller 110 over PCIe bus 240. In one embodiment, storage device 135A may be external to storage controller 110 as part of storage array 130. In another embodiment, storage controller 110 and storage device 135A may be part of a single device or appliance. In other embodiments, storage controller 110 may include different and/or additional components which are not shown to simplify the description. Storage device 135A may include one or more mass storage devices which can include, for example, flash memory or solid-state drives (SSDs). In one embodiment, storage device 135A also includes memory such as random-access memory (RAM); dynamic random-access memory (DRAM); erasable programmable memory (e.g., EPROM and EEPROM); flash memory; or any other type of storage medium.

In one embodiment, user space application 142 may generate or issue storage commands to be executed on storage device 135A. These commands may include I/O commands, such as read operations, write operations, etc., or administrative commands, such as firmware updates, debug operations, asynchronous event notifications, etc. In one embodiment, storage controller 110 includes a number of queues 220, into which the storage commands may be placed and eventually fetched by storage device 135A for execution. In general, kernel space device driver 144 is responsible for management and allocation of queues 220 and for placing the storage commands into the queues 220.

For certain commands, user space application 142 can pass the commands to kernel space 214 for processing. Depending on the type of command, user space application 142 may make a system call 232 to a block layer 246 in kernel space 214. The block layer can translate a file referenced by the system call to storage blocks on storage device 135A and provide an indication of the corresponding storage blocks to kernel space device driver 144. In another embodiment, user space application 142 may pass the command directly to kernel space device driver 144. Upon receipt, kernel space device driver may send (235, 236) the command to a queue 224 or 226 that has been reserved for use by the kernel space device driver 144. In one embodiment, queue 224 is an admin queue, while queue 226 is an I/O queue. In one embodiment, it is at the discretion of user space application 142 which types of commands are routed through the kernel space 214, although kernel space device driver 144 may be configured to handle both administrative commands and I/O commands.

Since kernel space device driver 144 runs in kernel space 214, storage commands from user space application 142 that are passed to kernel space device driver before being placed onto one of the queues 220 may experience some additional latency associated with traversing the kernel stack (i.e., block layer 246, kernel space device driver 144 and any other components in kernel space 214). Accordingly, in one embodiment, user space application 142 is configured to place certain commands directly into one of queues 220 without routing the commands through kernel space 214. For example, user space application 142 may place (231) certain latency-sensitive I/O commands directly into I/O queue 222. This prevents any delay associated with routing the commands through kernel space 214. In one embodiment, storage controller 110 includes memory mapped registers called doorbell registers. When the user space application 142 writes a command to the memory of a particular queue, it also updates the doorbell register to point to this newly written memory location (e.g., an index into the queue for NVMe). Since the queue memory is previously registered with the storage device on queue creation for the doorbell register, the device knows where to look for the new command.

In one embodiment, to configure I/O queue 222 for direct access from user space 212, user space application may send a system call or command 233 to kernel space device driver 144 for reservation of the I/O queue. Kernel space device driver 144 may determine whether or not an I/O queue has already been reserved for user space application 142, and if not, may allocate I/O queue 222. In one embodiment, system call 233 requests that the kernel map some of the user space memory so writes to it get sent by direct memory access (DMA) or memory mapped I/O, to the device. In one embodiment, the request sent to the kernel is an I/O control system call (e.g., ioctl) to create the queue and the corresponding memory mapping. The queue creation turns into a command sent to the drive, and the memory mapping is handled by an I/O memory management unit (IOMMU). Once allocated, kernel space device driver 144 may return a confirmation that the queue has been reserved for user space application 142, and user space application 142 is free to directly place storage commands onto I/O queue 222.

In one embodiment, storage device 135A may retrieve the stored commands from queues 220 for execution. In one embodiment, storage device 135A uses a polling approach where it periodically queries queues 220 to determine whether any pending storage commands are present. In another embodiment, an interrupt approach is used, where storage controller 110 sends an interrupt to storage device 135A to notify it that queues 220 include pending storage commands. In one embodiment, PCIe bus 240 operates within the framework of the NVMe communication interface. According to this framework, storage device 135A may fetch commands from the queues 220, execute the fetched commands, and return results to corresponding completion queues (not shown). In one embodiment, each of queues 220 includes a corresponding completion queue to form a set of NVMe queue pairs. In one embodiment, storage controller 110 may include a separate set of I/O queue pairs for each of storage devices 135A-n in storage array 130. In another embodiment, the queues are located on one of the storage device in storage array 130. In this embodiment, user space application 142 uses a polling approach where it periodically queries the submission queues to determine whether there is room to send new storage commands or the completion queues to determine whether there are any received confirmations. In another embodiment, an interrupt approach is used, where the storage device sends an interrupt to user space application 142 to notify it that the submission queues have room or that the completion queues have confirmations.

Figure 3:
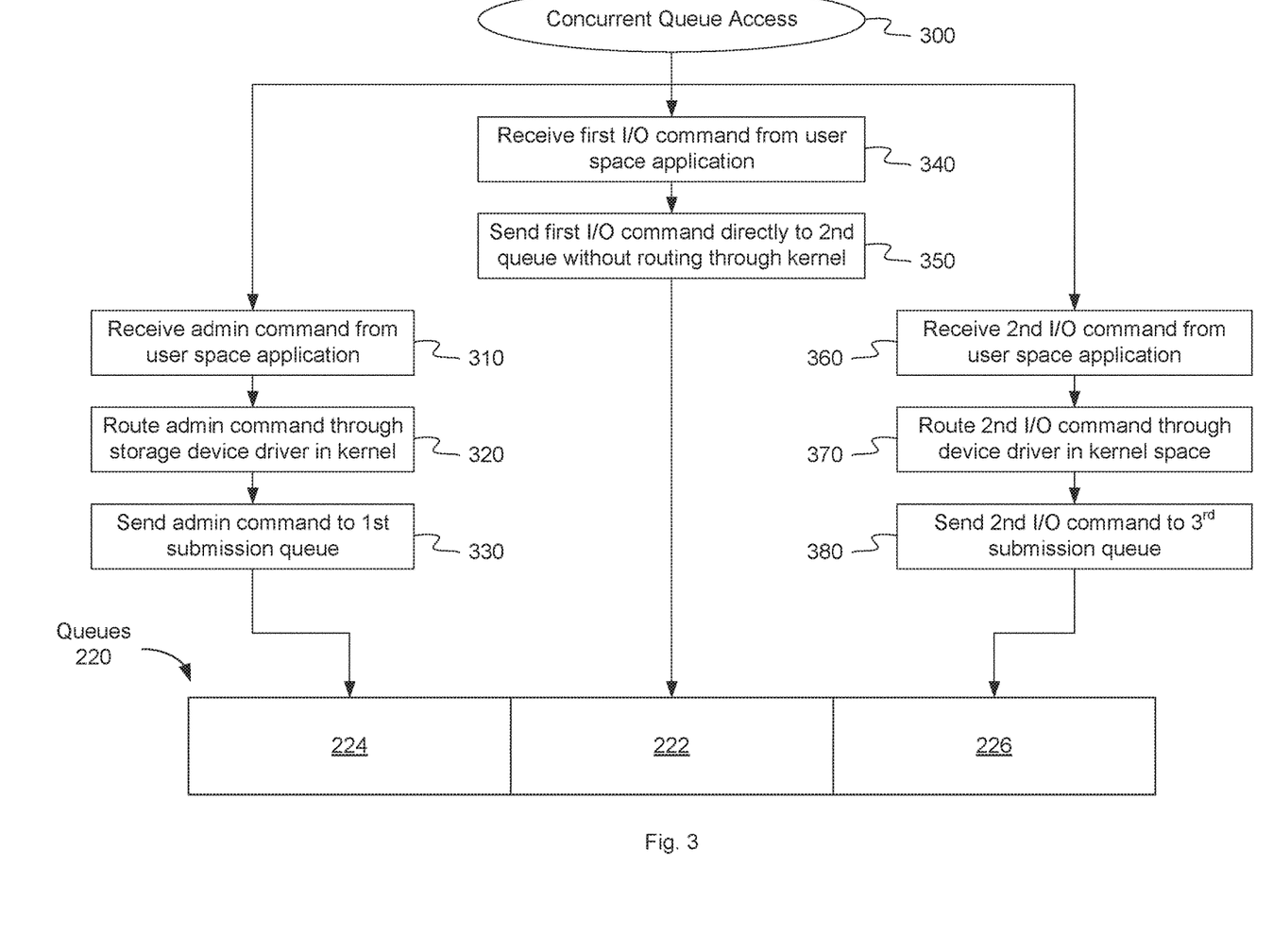
FIG. 3 is a flow diagram illustrating a method for concurrent user space and kernel space access to memory devices through private queues, according to an embodiment.

FIG. 3 is a flow diagram illustrating a method for concurrent user space and kernel space access to memory devices through private queues, according to an embodiment. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. In one embodiment, method 300 may be performed by storage controller 110, as shown in FIGS. 1 and 2.

Referring to FIG. 3, at block 310, method 300 receives an administrative command from an application 142 in a user space 212 of the storage controller 110. In one embodiment application 142 issues an administrative command, such as a firmware update, debug operation, or other command which is not comparatively sensitive to processing latency. At block 320, method 300 routes the administrative command through kernel space device driver 144 in a kernel space 214 of the storage controller 110. In one embodiment, application 142 makes a system call corresponding to the administrative command which is received by block layer 246. Block layer 246 may translate a file referenced by the system call to corresponding storage blocks on storage device 135A and provide an indication of the storage blocks to kernel space device driver 144 in kernel space 214. In other embodiments, application 142 may pass the administrative command directly to kernel space device driver 144. At block 330, method 300 sends the administrative command to a first queue 224 of a plurality of queues 220, where the first queue 224 is reserved for use by the kernel space device driver 144. In one embodiment, kernel space device driver 144 places the administrative command onto queue 224 from where it may be retrieved by storage device 135A.

At block 340, method 300 receives a first I/O command from the application 142 in user space 212 of the storage controller 110. In one embodiment application 142 issues the I/O command, such as a read command, a write command, or other command which is sensitive to processing latency. At block 350, method 300 sends the first I/O command directly to a second I/O queue 222 of the plurality of queues 220 without routing the first I/O command through the kernel space 214 of the storage controller 110. In one embodiment, user space application can place the I/O command onto I/O queue 222, which has been reserved for direct access by user space application 142.

At block 360, method 300 receives a second I/O command from application 142 in user space 212 of the storage controller 110. The second I/O command may be the same as or similar to the first I/O command, in that it includes a read command or a write command. In another embodiment, the second I/O command may be received from some other application besides user space application 142. In one embodiment, however, the second I/O command may be passed through kernel space 214 rather than written directly onto an I/O queue 220. At block 370, method 300 routes the second I/O command through kernel space device driver 144 in kernel space 214 of the storage controller 110. Kernel space device driver 144 is configured to process any type of command including either administrative commands or I/O commands. Thus, it is at the discretion of user space application 142 whether to place commands directly onto an I/O queue or to route the commands through kernel space 214. At block 380, method 300 sends the second I/O command to a third I/O queue 226 of a plurality of queues 220, where the third I/O queue 226 is reserved for use by the kernel space device driver 144. As a result, method 300 can place commands on queues 220 concurrently and can write commands from the first queue 224, the second I/O queue 222, and the third I/O queue 226 to storage device 135A concurrently. In one embodiment, storage device 135A can retrieve pending commands from any of queues 220 concurrently, as well. In this manner, both applications in user space 212 and drivers in kernel space 214 can have concurrent access to storage device 135A.

Figure 4:
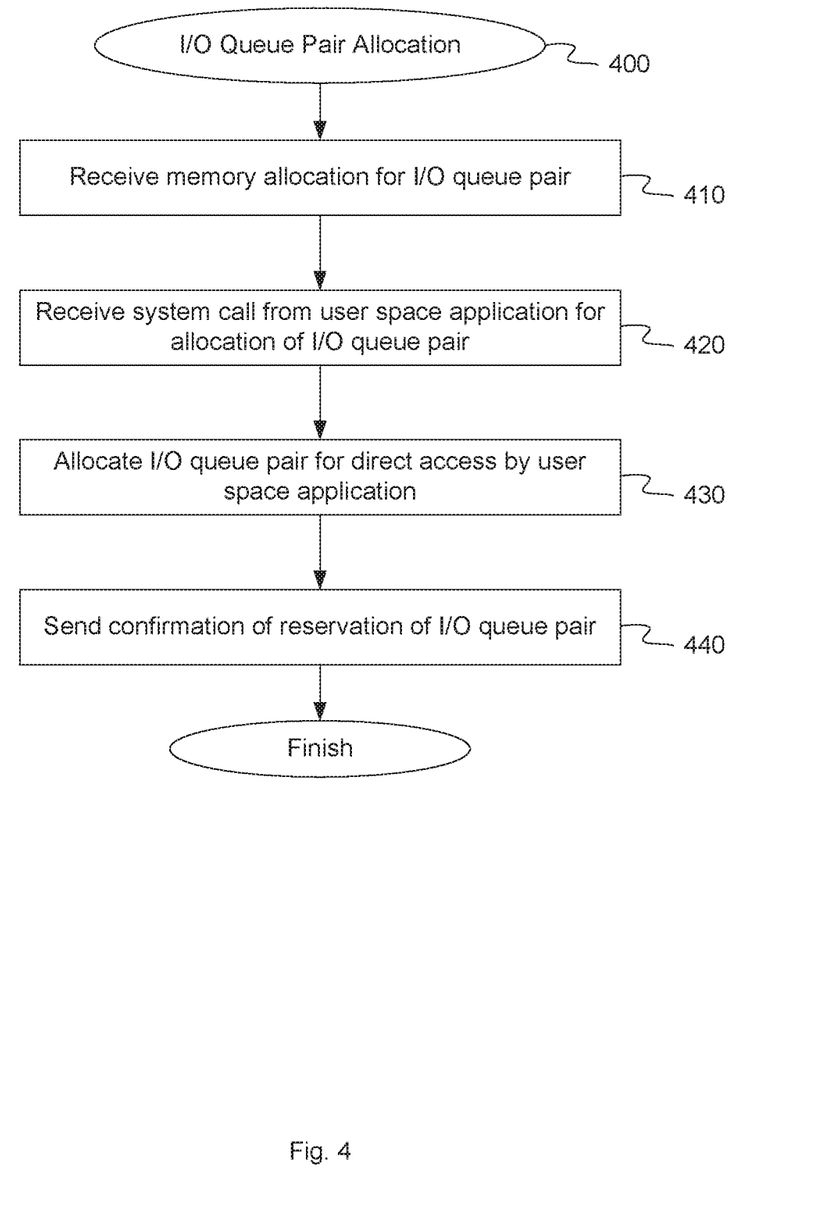
FIG. 4 is a flow diagram illustrating a method for allocation of I/O queue pairs for direct user space access, according to an embodiment.

FIG. 4 is a flow diagram illustrating a method for allocation of I/O queue pairs for direct user space access, according to an embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. In one embodiment, method 400 may be performed by kernel space device driver 144, as shown in FIGS. 1 and 2.

Referring to FIG. 4, at block 410, method 400 receives a memory allocation for an I/O queue pair. At lock 420, method 400 receives a system call or command from application 142 running in user space 212 requesting allocation of an I/O queue pair, including a submission queue and completion queue, at the memory addresses allocated at block 410. In one embodiment, to configure I/O queue 222 (and a corresponding completion queue) for direct access from user space 212, user space application 142 may send a system call or command 233 to kernel space device driver 144 for reservation of the I/O queue pair. At block 430, method 400 allocates the second I/O queue 222 (and the corresponding completion queue) for direct access by user space application 142. Once the I/O queue pair is allocated, at block 440, method 400 sends a confirmation of the reservation of the I/O queue pair to user space application 142.

Figure 5:
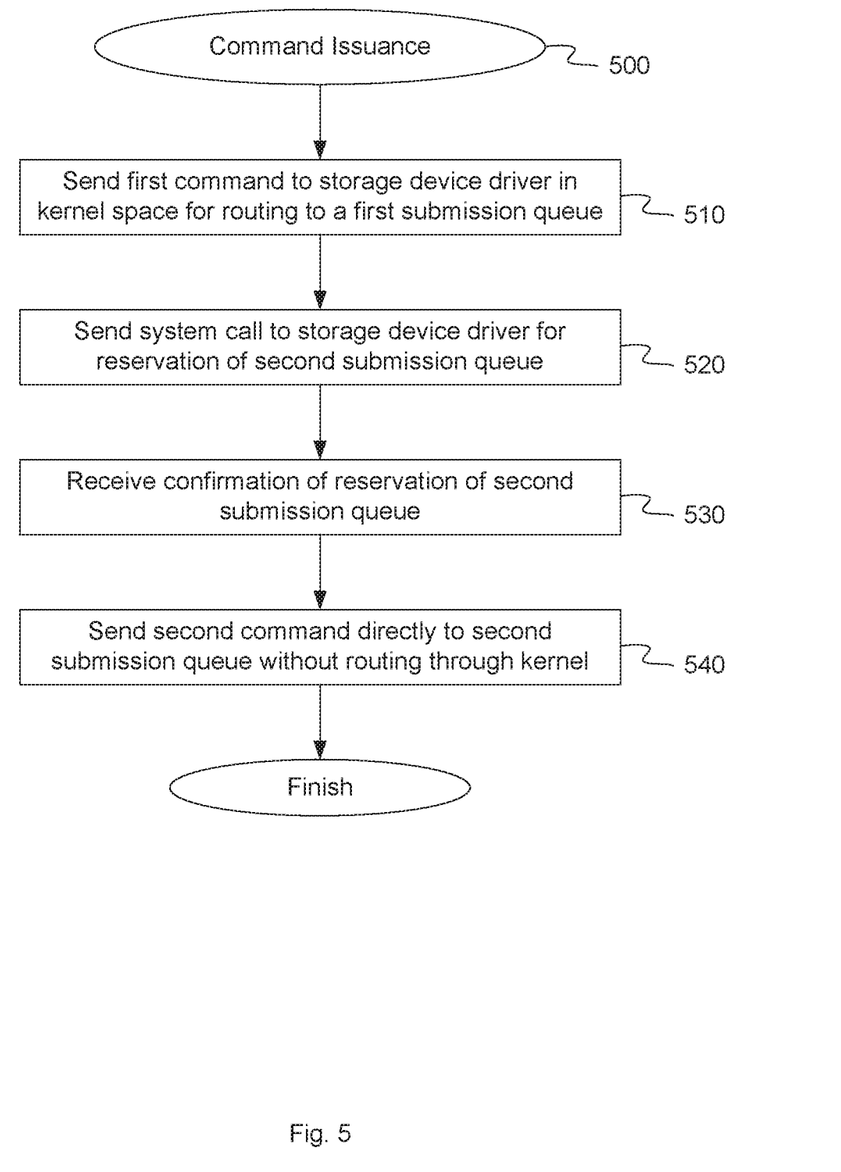
FIG. 5 is a flow diagram illustrating a method for issuing commands to kernel space and directly to submission queues, according to an embodiment.

FIG. 5 is a flow diagram illustrating a method for issuing commands to kernel space and directly to I/O queues, according to an embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. In one embodiment, method 500 may be performed by user space application 142, as shown in FIGS. 1 and 2.

Referring to FIG. 5, at block 510, method 500 sends a first command to a kernel space device driver 144 in a kernel space 214 of the storage controller 110, the kernel space device driver 144 to send the first command to a first queue 224 of a plurality of queues 220 associated with a storage device 135A coupled to the storage controller 110, the first queue 224 being reserved for use by the kernel space device driver 144. At block 520, method 500 sends a system call or command to kernel space device driver 144 for reservation of a second I/O queue 222 for direct access by user space application 142. At block 530, method 500 receives a confirmation of the reservation of I/O queue 222. At block 540, method 500 sends a second command directly to the second I/O queue 222 without routing the second command through the kernel space 214 of the storage controller 110.

Figure 6:
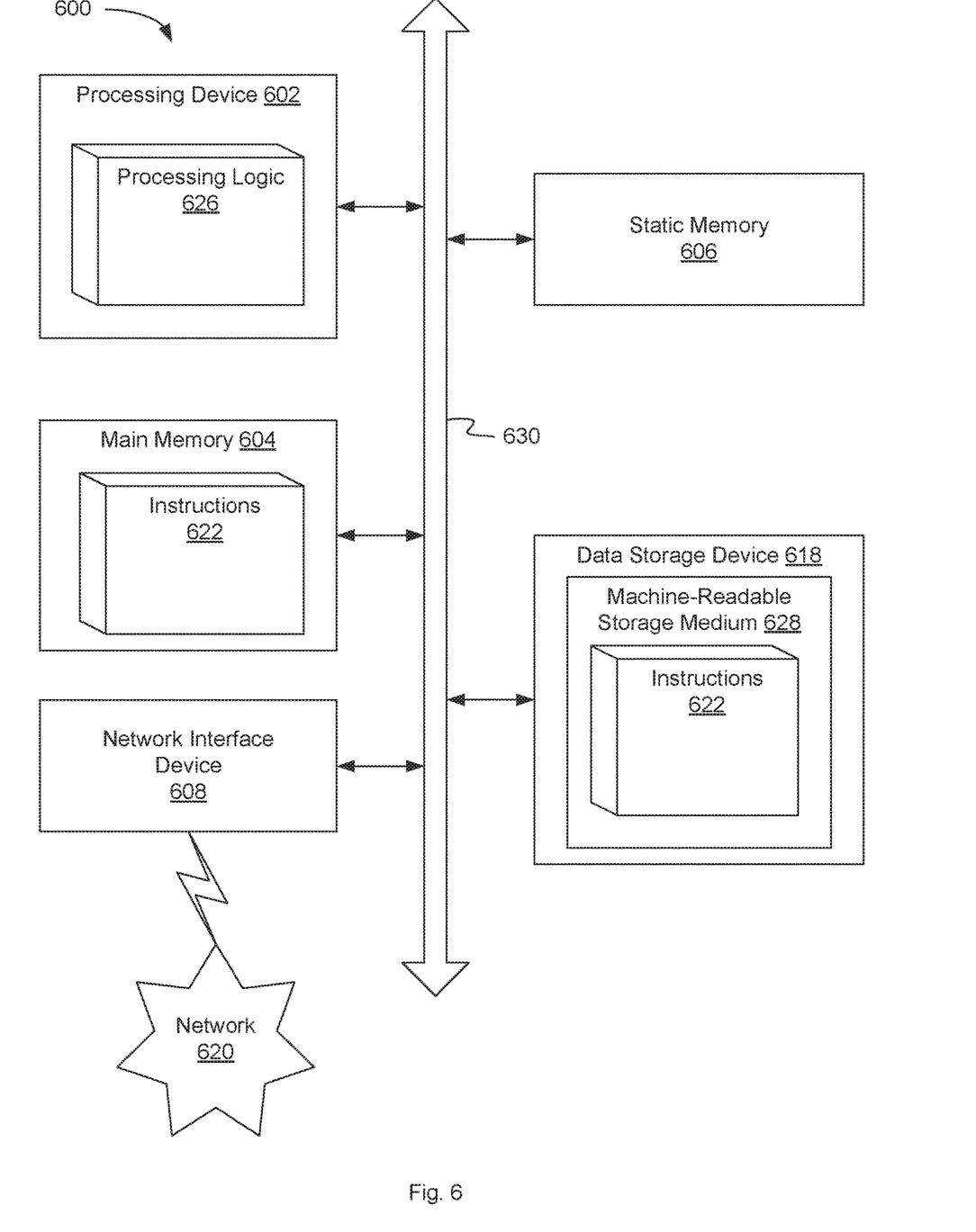
FIG. 6 is a block diagram illustrating an exemplary computer system in which embodiments of the present disclosure may be implemented.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as storage controller 110 or of a client, such as initiator devices 115 or 125.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Data storage device 618 may be one example of any of the storage devices 135A-n in FIGS. 1 and 2. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of user space application 142 or device driver 144 shown in FIGS. 1 and 2, or of initiator application 112 or 122, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute user space application 142, kernel space device driver 144 or initiator application 112 or 122. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for user space and kernel space access of s memory device using private queues, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A system comprising:
    a storage array comprising a plurality of storage devices; and
    a storage controller coupled to the storage array, the storage controller comprising a plurality of submission queues corresponding to a first storage device of the plurality of storage devices and a processing device, the processing device to:
        receive an administrative command from an application in a user space of the storage controller, wherein the administrative command is routed through a kernel space device driver in a kernel space of the storage controller;
        send the administrative command to a first submission queue of the plurality of submission queues, the first submission queue being reserved for use by the kernel space device driver;
        receive a first input/output (I/O) command from the application in the user space; and
        send the first I/O command to a second submission queue of the plurality of submission queues without routing the first I/O command through the kernel space, the second submission queue being reserved for direct access by the application in the user space.

2. The system of claim 1, wherein the administrative command comprises at least one of a firmware update or a debug operation corresponding to the first storage device.

3. The system of claim 1, wherein the processing device further to:
    receive a system call corresponding to the administrative command, the system call made to a block layer in the kernel space of the storage controller, the block layer to translate a file referenced by the system call to storage blocks on the first storage device and provide an indication of the storage blocks to the kernel space device driver.

4. The system of claim 1, wherein the first I/O command comprises at least one of a write operation or a read operation corresponding to data stored on the first storage device.

5. The system of claim 1, wherein the first submission queue and the second submission queue are to communicate concurrently with the first storage device.

6. The system of claim 1, wherein the processing device further to:
receive a second I/O command from the application in the user space, wherein the second I/O command is routed through the kernel space device driver; and
send the second I/O command to a third submission queue of the plurality of submission queues.

7. A method comprising:
receiving, by a kernel space device driver running in a kernel space of a computing device, a first command from an application running in a user space of the computing device;
writing the first command to a first submission queue of a plurality of submission queues associated with a storage drive coupled to the computing device, the first submission queue being reserved for use by the kernel space device driver;
receiving a second command from the application running in the user space; and
writing the second command to a second submission queue of the plurality of submission queues without routing the second command through the kernel space, the second submission queue being reserved for direct access by the application running in the user space.

8. The method of claim 7, wherein the first command comprises an administrative command.

9. The method of claim 7, further comprising:
receiving a system call corresponding to the first command, the system call made to a block layer in the kernel space of the storage controller, the block layer to translate a file referenced by the system call to storage blocks on the storage drive and provide an indication of the storage blocks to the kernel space device driver.

10. The method of claim 7, wherein the second command comprises an input/output (I/O) command.

11. The method of claim 7, wherein the first submission queue and the second submission queue are to communicate concurrently with the storage drive.

12. The method of claim 7, further comprising:
receiving a system call from the application running in the user space; and
determining whether the second submission queue has been reserved; and
in response to the system call, allocating the second submission queue for direct access by the application.

13. The method of claim 12, wherein allocating the second submission queue comprises updating configuration parameters and queue mapping data in a virtual memory space managed by the kernel space device driver.

14. A non-transitory computer readable storage medium storing instructions, which when executed, cause a processing device to:
send, by an application in a user space of a storage controller, a first command to a kernel space device driver in a kernel space of the storage controller, the kernel space device driver to send the first command to a first submission queue of a plurality of submission queues associated with a storage device coupled to the storage controller, the first submission queue being reserved for use by the kernel space device driver; and
send, by the application in the user space, a second command to a second submission queue of the plurality of submission queues without routing the second command through the kernel space, the second submission queue being reserved for direct access by the application in the user space.

15. The non-transitory computer readable storage medium of claim 14, wherein the first command comprises an administrative command.

16. The non-transitory computer readable storage medium of claim 14, wherein the instructions cause the processing device further to:
send a system call corresponding to the first command to a block layer in the kernel space of the storage controller, the block layer to translate a file referenced by the system call to storage blocks on the storage device and provide an indication of the storage blocks to the kernel space device driver.

17. The non-transitory computer readable storage medium of claim 14, wherein the second command comprises an input/output (I/O) command.

18. The non-transitory computer readable storage medium of claim 14, wherein the first submission queue and the second submission queue are to communicate concurrently with the storage device.

19. The non-transitory computer readable storage medium of claim 14, wherein the instructions cause the processing device further to:
send a system call to the kernel space device driver in the kernel space of the storage controller, the system call to cause the kernel space device driver to allocate the second submission queue for direct access by the application.

20. The non-transitory computer readable storage medium of claim 14, wherein the application comprises at least one of an operating system, a file system, a database or a computer application program.

* * * * *